United States Patent
Rubey et al.

(10) Patent No.: US 10,143,194 B2
(45) Date of Patent: Dec. 4, 2018

(54) VEHICLE MOUNTED ELEVATABLE PLATFORM SYSTEM

(75) Inventors: Todd A. Rubey, Roseville, MN (US); Jeffry M. Olson, Ham Lake, MN (US)

(73) Assignee: Traveling Tower LLC, Roseville, MN (US)

( * ) Notice: Subject to any disclaimer, the term of this patent is extended or adjusted under 35 U.S.C. 154(b) by 180 days.

(21) Appl. No.: 13/029,882

(22) Filed: Feb. 17, 2011

(65) Prior Publication Data

US 2012/0211304 A1 Aug. 23, 2012

(51) Int. Cl.
*A01M 31/02* (2006.01)
*E04G 1/24* (2006.01)
*B66F 11/04* (2006.01)

(52) U.S. Cl.
CPC ............ *A01M 31/02* (2013.01); *B66F 11/04* (2013.01); *E04G 1/24* (2013.01)

(58) Field of Classification Search
CPC ........... A01M 31/02; B66F 11/04; E04G 1/24
USPC ........... 182/63.1, 64.1, 68.1, 68.2, 69.6, 2.7
See application file for complete search history.

(56) References Cited

U.S. PATENT DOCUMENTS

| | | | | | |
|---|---|---|---|---|---|
| 221,401 | A | * | 11/1879 | Drake | E06C 1/381 169/25 |
| 497,952 | A | * | 5/1893 | Davis | 182/2.7 |
| 533,059 | A | * | 1/1895 | Harthan | 182/2.7 |
| 1,362,944 | A | * | 12/1920 | Kirby | A01D 46/20 182/145 |
| 3,110,359 | A | * | 11/1963 | Solomon | 182/2.7 |
| 3,529,694 | A | * | 9/1970 | Atchey | 182/2.7 |
| 3,882,964 | A | * | 5/1975 | Schellenberg | B66F 11/04 182/127 |
| 4,719,716 | A | * | 1/1988 | Chrisley, Jr. | E04H 1/1205 43/1 |
| 4,787,477 | A | | 11/1988 | Dolan | |
| 4,800,986 | A | * | 1/1989 | Hayes, III | B60P 3/00 182/116 |
| 5,042,614 | A | | 8/1991 | Rainey | |
| 5,295,555 | A | * | 3/1994 | Strange | E06C 5/04 182/116 |
| 5,297,844 | A | | 3/1994 | Haustein | |
| 5,409,081 | A | * | 4/1995 | Reeves | A01M 31/02 182/116 |
| 5,634,529 | A | * | 6/1997 | Nguyen et al. | 182/113 |
| 6,460,653 | B1 | * | 10/2002 | Hardy | B60P 1/02 182/63.1 |
| 6,523,641 | B2 | * | 2/2003 | Smith | A01M 31/02 182/127 |
| 6,604,606 | B1 | * | 8/2003 | McDougal et al. | 182/127 |
| 6,637,549 | B1 | * | 10/2003 | Lopacki | A01M 31/02 182/115 |

(Continued)

*Primary Examiner* — Colleen M Chavchavadze
(74) *Attorney, Agent, or Firm* — Patterson Thuente Pedersen, P.A.

(57) ABSTRACT

An elevatable platform system for mounting on a vehicle having an elevatable platform elevatable by a collapsible support structure. The support structure is adapted to move the elevatable platform between a lowered position in which the elevatable platform is positioned at a height proximate to or below the height of the vehicle and an elevated position in which the elevatable platform is elevated above the vehicle. Support legs integrated into the support structure can be deployed from the support structure when the elevatable platform is elevated to further stabilize the elevated platform.

14 Claims, 17 Drawing Sheets

(56) References Cited

U.S. PATENT DOCUMENTS

| | | | |
|---|---|---|---|
| 6,688,429 B2 | 2/2004 | McKay | |
| 6,739,428 B1 | 5/2004 | Holmes et al. | |
| 6,802,391 B2 * | 10/2004 | Ganiere | 182/69.6 |
| 6,991,064 B2 * | 1/2006 | Ehrenleitner | 182/141 |
| 7,055,878 B2 * | 6/2006 | Imhof | B60P 3/32 |
| | | | 296/26.07 |
| 7,194,842 B2 * | 3/2007 | Baird | B66F 11/04 |
| | | | 182/127 |
| 7,389,854 B1 * | 6/2008 | Johnson et al. | 182/127 |
| 7,448,470 B2 * | 11/2008 | Brown | B66F 11/042 |
| | | | 182/63.1 |
| 2002/0139613 A1 * | 10/2002 | Hardy | B60P 1/02 |
| | | | 182/63.1 |
| 2006/0162999 A1 * | 7/2006 | Atkins | E06C 5/04 |
| | | | 182/63.1 |
| 2008/0149420 A1 * | 6/2008 | Cheatham | 182/63.1 |
| 2009/0107762 A1 * | 4/2009 | Davis | 182/63.1 |

* cited by examiner

VEHICLE MOUNTED ELEVATABLE PLATFORM SYSTEM

FIELD OF THE DISCLOSURE

The present invention is directed to an elevatable platform system mountable to a recreational or utility vehicle. More specifically, the present invention is directed to an elevatable platform system providing increased functionality and safety during transport in a lowered position and when assembled to an elevated position above the vehicle.

BACKGROUND OF THE DISCLOSURE

Elevated platforms are used for a variety of recreational and utilitarian uses ranging from elevated shooting platforms for hunters to camera platforms at sporting events for photographers. As a result, elevated platforms can come in a variety of forms ranging from platforms mounted to an existing support structure to free standing platforms that have an integrated support structure. Regardless of the particular use or form of the elevated platform, all elevated platforms must present an elevated surface generally parallel to the ground that is sufficiently stable to allow individuals to safely stand and move on the elevated surface, often while the individual is wielding a firearm, a camera or other equipment.

Freestanding elevated platforms having an integrated support structure are often preferred to elevated platforms mounted to existing support structures in locations where suitable support structures are scarce such as near sports fields or in sparsely wooded areas. However, an inherent drawback of freestanding elevated platforms is that the large and often unwieldy integrated support structure must be transported to and positioned at the desired location. As such, freestanding elevated platforms are often constructed with lightweight materials arranged in a basic framework configuration that is easily transportable, but as a result is often less stable. The inherent tradeoff between weight and stability limit the effectiveness of freestanding elevated platforms.

In an effort to improve the stability of freestanding elevated platforms, integrated support structures are often mounted to vehicles to assist in the transport and positioning of the elevated platforms. By mounting the freestanding elevated platform to a vehicle, heavier and more stable support structures can be used. While this approach improves the effectiveness of freestanding elevated platforms, the presently available vehicle mounted elevated platforms suffer from a number of drawbacks. For example, many presently available vehicle mounted platforms, such as depicted in U.S. Pat. No. 5,297,844, extend above the vehicle when mounted to the vehicle even when the vehicle is in motion. Although some vehicle mounted platforms, such as depicted in U.S. Pat. No. 6,739,428, are switchable between a deployed configuration in which the elevated platform extended above the vehicle and a retracted configuration for transporting the elevated platform, at least a portion of the platform or support structure remains extended above the vehicle even in the retracted position. However, mounting the platform to a vehicle such that the platform extends above the vehicle at all times can shift the center of mass of the combined platform and vehicle significantly higher creating a risk of a rollover while the vehicle is moving. Similarly, the elevated platform can become caught on or impact low hanging structures or objects, which limits the areas that the mounted platform can be navigated to by the vehicle.

A related drawback to presently available vehicle mounted platforms is that the most presently available platforms often incorporate the vehicle as part of the support structure. For example, the support structures depicted in U.S. Pat. Nos. 4,787,477 and 5,042,614 are mounted to the vehicle's frame and use the vehicle as a base to maintain the balance of the support structure. Most recreational and utility vehicles comprise components for navigating rough terrain, such as shock absorbers. However, these components are typically designed to allow the wheels of the vehicle to move up and down relative the vehicle frame in response to rough terrain and as such also decreases the stability of any platform mounted to the vehicle frame. Similarly, if the vehicle is not positioned on a flat surface and as a result is slightly tilted, the mounted platform will be similarly tilted reducing the stability of the platform.

Presently available vehicle mounted platforms are effective for transporting and positioning freestanding elevated platforms, but suffer from a number of drawbacks that affect the overall performance of the elevated platform and that limit the locations suitable for using the elevated platforms.

SUMMARY OF THE DISCLOSURE

The present invention is generally directed to an elevatable platform system mountable on a recreational or utility vehicle. The platform system can generally comprise an elevatable platform and a collapsible support structure for vertically positioning the elevatable platform and mounting the platform system onto a vehicle. The collapsible support structure is adapted to move the elevatable platform between an elevated position in which the platform is elevated above the vehicle and a collapsed position in which the platform is lowered proximate to or below the height of the vehicle. The collapsible support structure can generally comprise at least one rotatable support beam rotatably mounted to the corners of the elevatable platform and adapted to rotate between a vertical orientation positioning the elevatable platform in the elevated position and a horizontal orientation positioning the elevatable platform in the lowered position.

According to an embodiment of the present invention, when the elevatable platform is positioned in the collapsed position, the elevatable platform can define the top of the platform system and can be positioned below the height of the vehicle driver for most conventional recreational and utility vehicles. In this configuration, the platform system can be transported and positioned by the vehicle through any space the vehicle can ordinarily be driven through without hitting any overhanging structures and objects. Similarly, in the lowered position, the center of mass of the combined vehicle-platform assembly can be proximate to the ordinary center of mass of the vehicle minimizing the risk that the vehicle will tip over due to the added platform assembly.

According to an embodiment of the present invention, the collapsible support structure can be adapted to move the elevatable platform between the elevated and collapsed position while maintaining the platform in an orientation generally parallel to the ground throughout the transition. In this configuration, the elevatable platform can serve as an "elevator" for lifting people or equipment to the elevated platform as the platform is transitioned from the lowered position, when people and equipment can be easily loaded onto the lowered platform, to the elevated position. With conventional elevated platforms, a user typically carries the equipment with them while climbing onto the elevated platform or pulls the equipment up via a rope after climbing onto the elevated platform. Either approach can require the user to make multiple trips and can easily result in injury to the user or damage to the equipment, especially when heavy items or firearms must be carried or lifted to the elevated platform. In the present invention, the equipment can be first loaded onto the elevated platform before being lifted up with the elevated platform thereby alleviating the need for the user to climb onto the elevated platform with the equipment or pull the equipment up to the platform. In addition, maintaining the platform in a generally parallel orientation can be used to safely elevate infirm individuals with the platform to the elevated position rather than risk climbing onto the elevated platform. The platform can also serve as a storage platform and perform a trailering function during ordinary movement of the vehicle, for example, when transporting the elevatable platform system to a use location.

According to an embodiment of the present invention, the collapsible support structure can further comprise at least one deployable support leg extendable from each of the support beams of the collapsible support structure after the elevated platform is positioned in the elevated position. The support legs are adapted to be braced against the ground proximate to the vehicle when the support beams are positioned in the vertical orientation so as to provide additional support to the elevated platform and increase the stability of the elevated platform. According to an embodiment of the present invention, the support legs can be extended to different lengths to account for uneven terrain beneath the vehicle and can be adapted to partially lift the support structure off the vehicle to maintain the elevated platform in an orientation substantially parallel to the ground if the vehicle is tilted due to uneven terrain.

According to an embodiment of the present invention, the collapsible support structure is collapsible such that the height of the collapsible structure is sufficiently elevated such that the collapsed portion of the structure extending from the vehicle can be maneuvered over the bed of a secondary vehicle, such as truck. In this configuration, a portion of the collapsed portion of the support structure can be positioned over the bed of the secondary vehicle and the collapsed portion can be disengaged from the primary vehicle. This arrangement allows for easy transport of the elevatable platform system by a larger secondary vehicle without the added hassle of lifting the system off the primary vehicle and loading the system onto the secondary vehicle by hand. In addition, when mounting the system to the primary vehicle, the operation can be performed in reverse such that the bed of the secondary vehicle acts as stabilizing platform during mounting of the system of the primary vehicle.

In another embodiment of the present invention, a method for positioning an elevated platform system can comprise mounting an elevatable platform system onto a vehicle such as an ATV or similar utility vehicle. The method can further comprise maneuvering the vehicle to a desired location such that an elevatable platform does not exceed the overall height of the vehicle. The method can further comprise extending a support structure thereby, elevating the elevatable platform to a position above the vehicle. The method can further comprise maintaining the elevatable platform in a substantially parallel orientation to the ground as the elevatable platform is lifted between a transport position and a lifted position. The method can further comprise extending support legs from the support structure to engage the ground beneath the vehicle so as to further stabilize the elevatable platform system when in the lifted position.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be completely understood in consideration of the following detailed description of various embodiments of the invention in connection with the accompanying drawings, in which.

Figure 1:
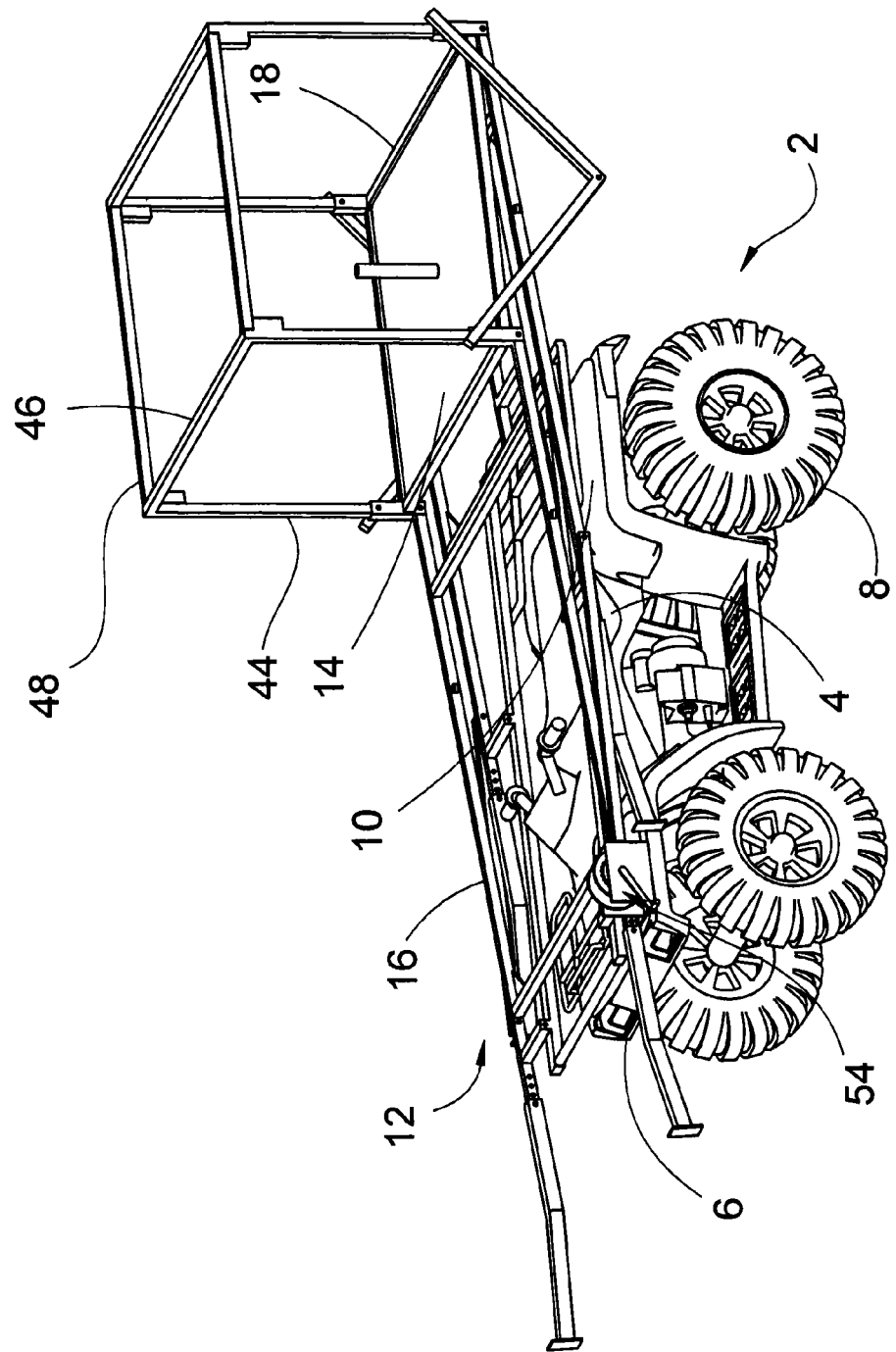
FIG. 1 is a side perspective view of an elevatable platform system mounted to a vehicle according to an embodiment of the present invention with the elevatable platform positioned in a lowered transport position.
Figure 2:
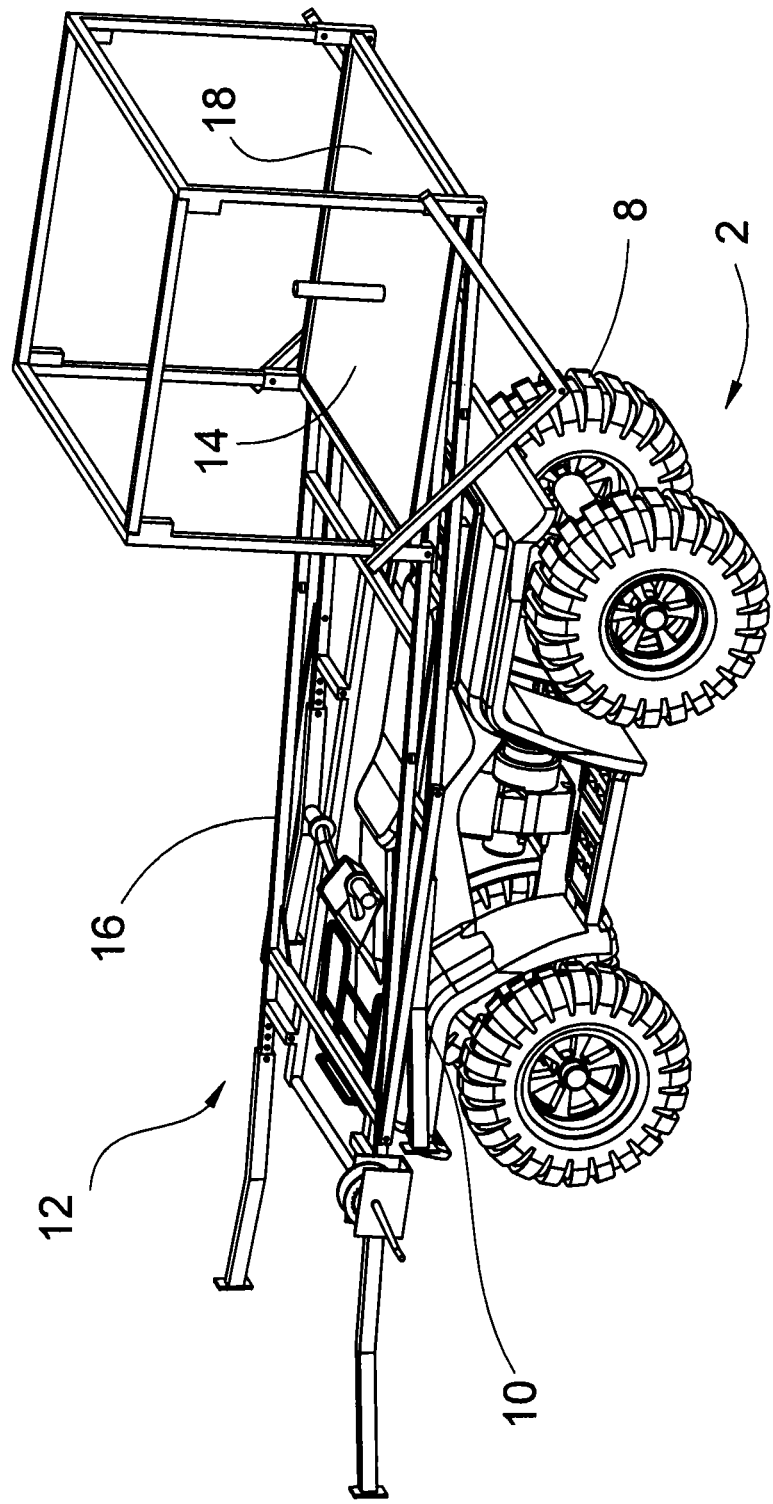
FIG. 2 is a rear perspective view of the elevatable platform system depicted in FIG. 1.
Figure 3:
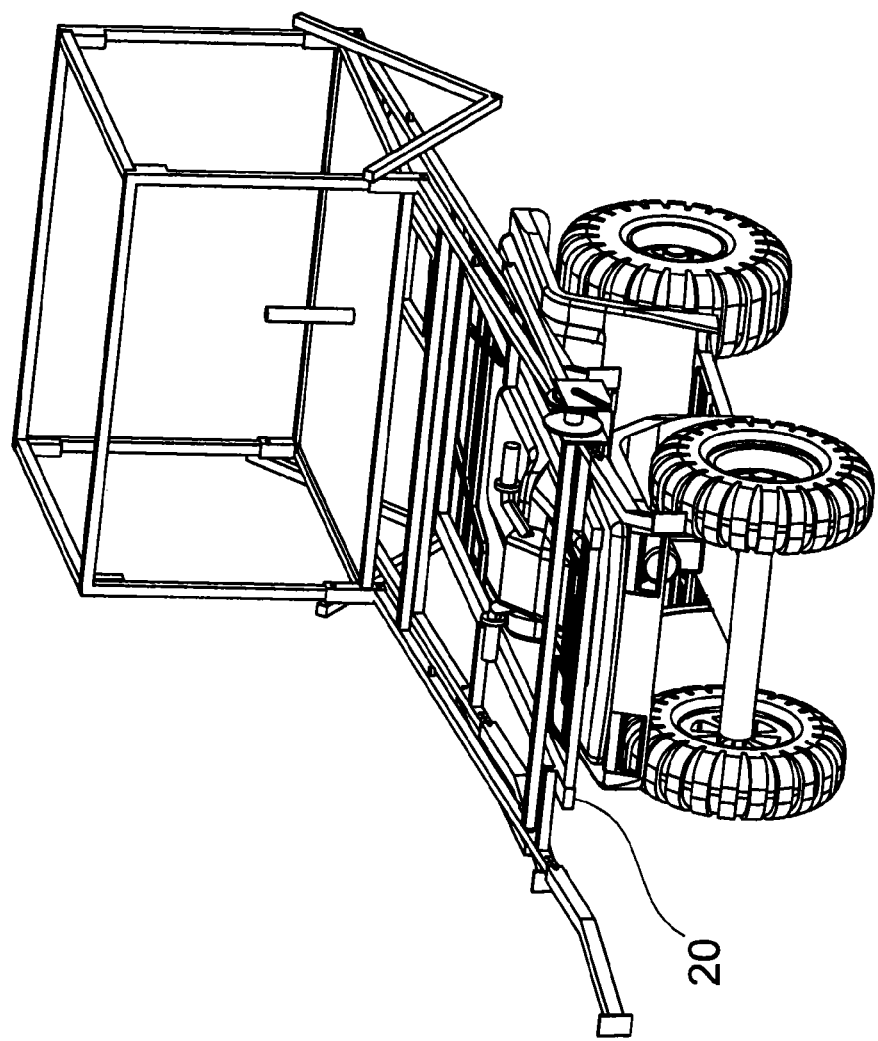
FIG. 3 is a front perspective view of the elevatable platform system depicted in FIG. 1.
Figure 4:
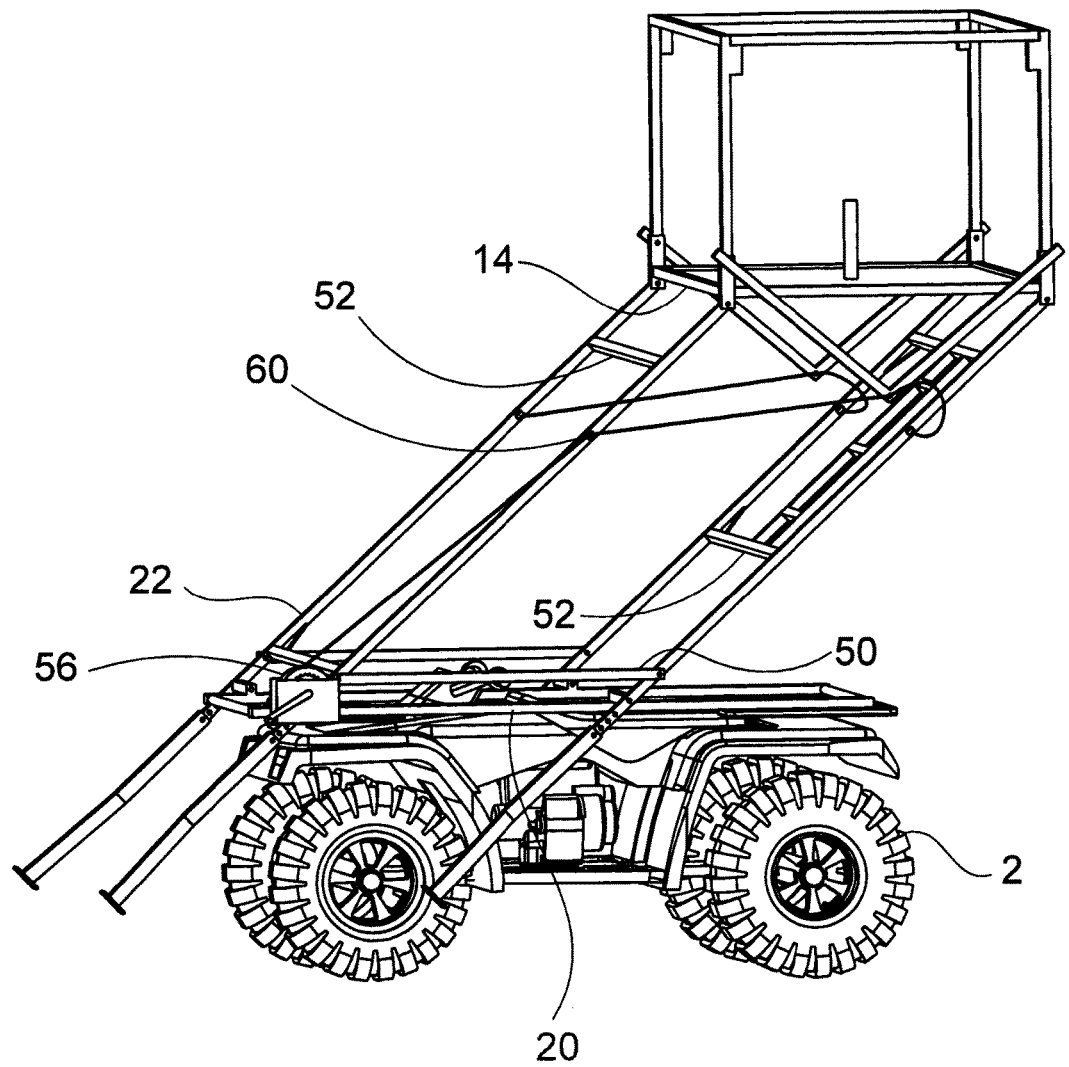
FIG. 4 is a front perspective view of the elevatable platform system depicted in FIG. 1 with the elevatable platform being transitioned between an elevated position and the lowered transport position.
Figure 5:
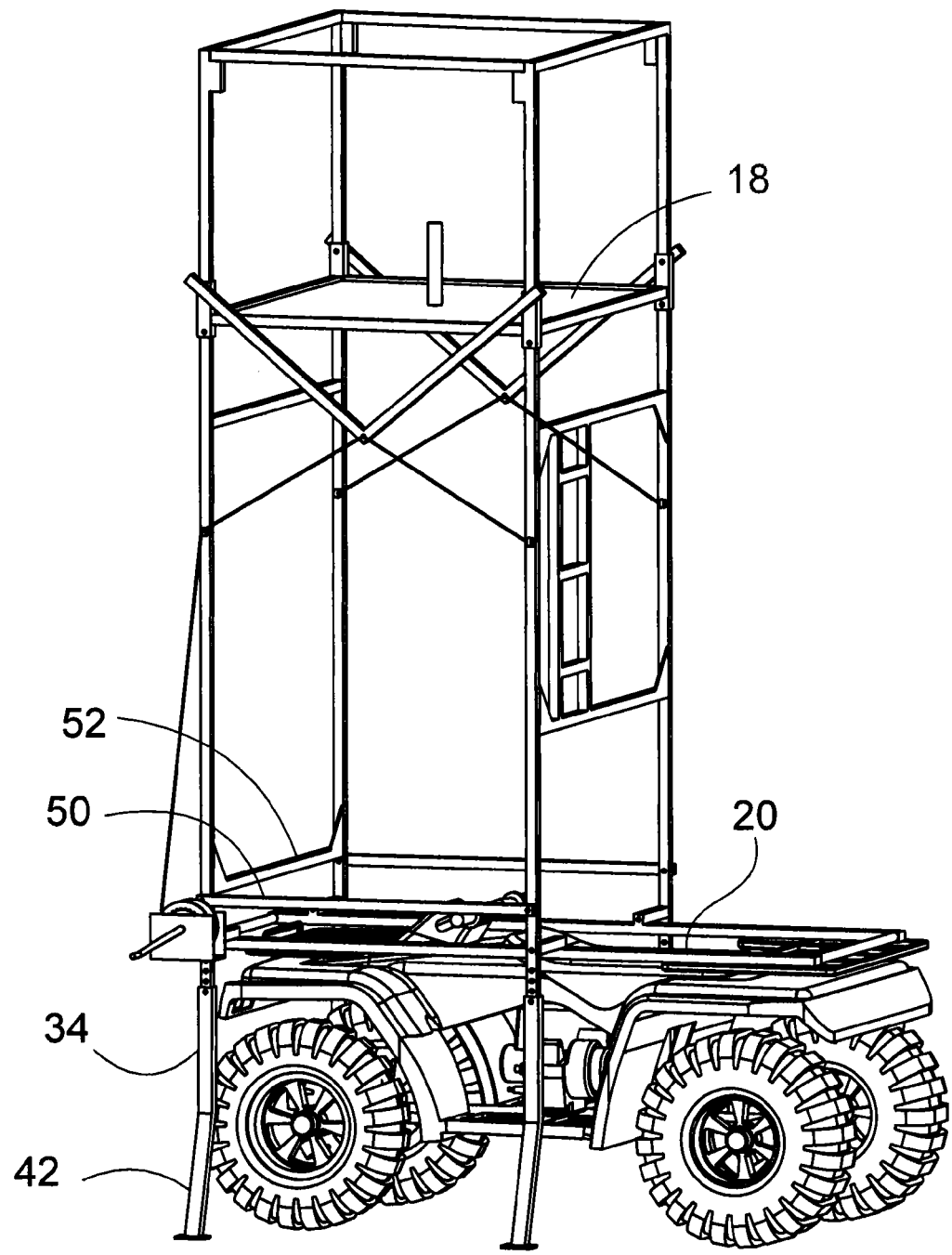
FIG. 5 is a side view of the elevatable platform depicted in FIG. 1 with the elevatable platform positioned in the elevated position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

Figure 15:
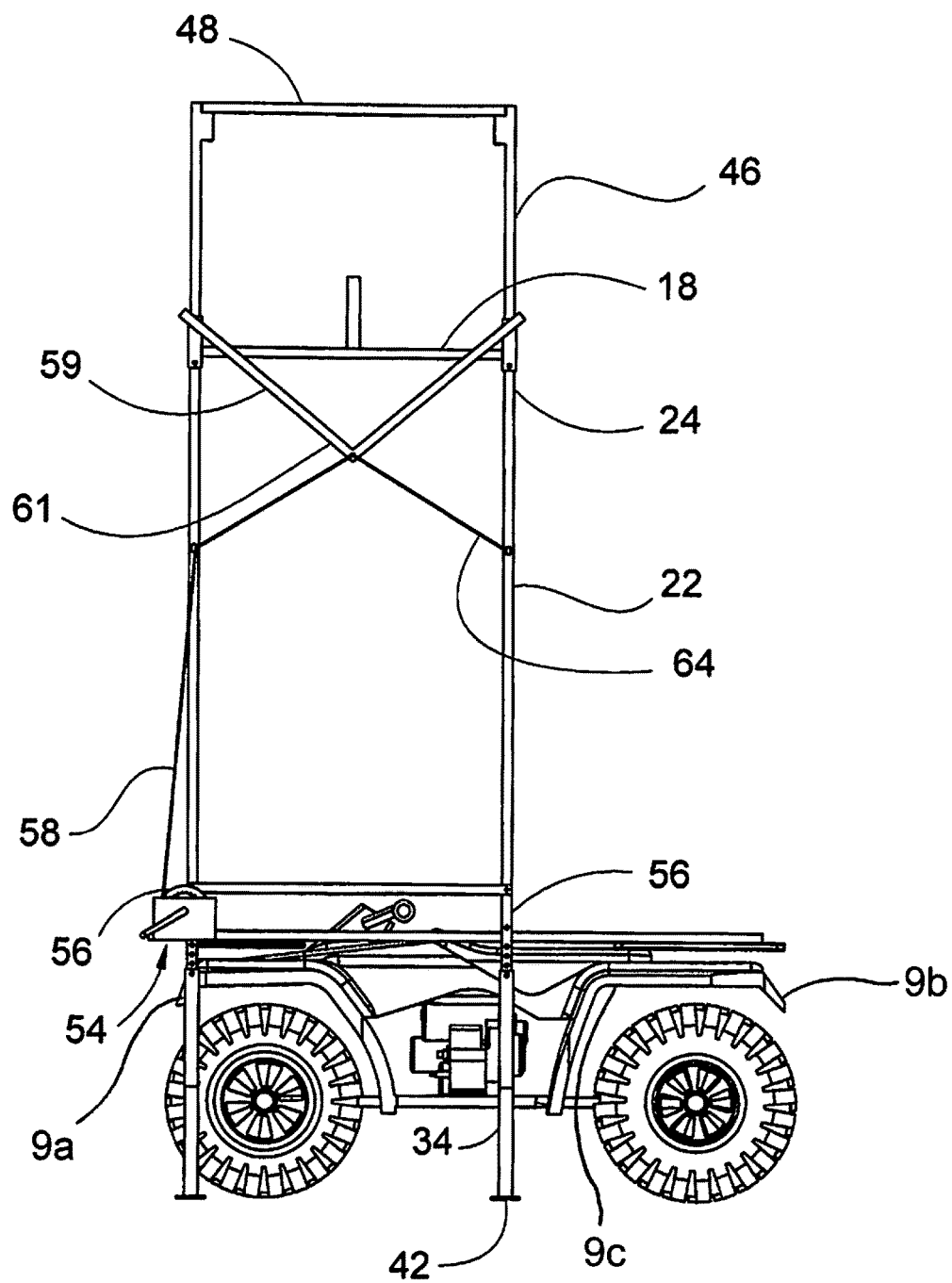
FIG. 15 is a side view of the elevatable platform depicted in FIG. 12 with the elevatable platform positioned in the elevated position.
Figure 16:
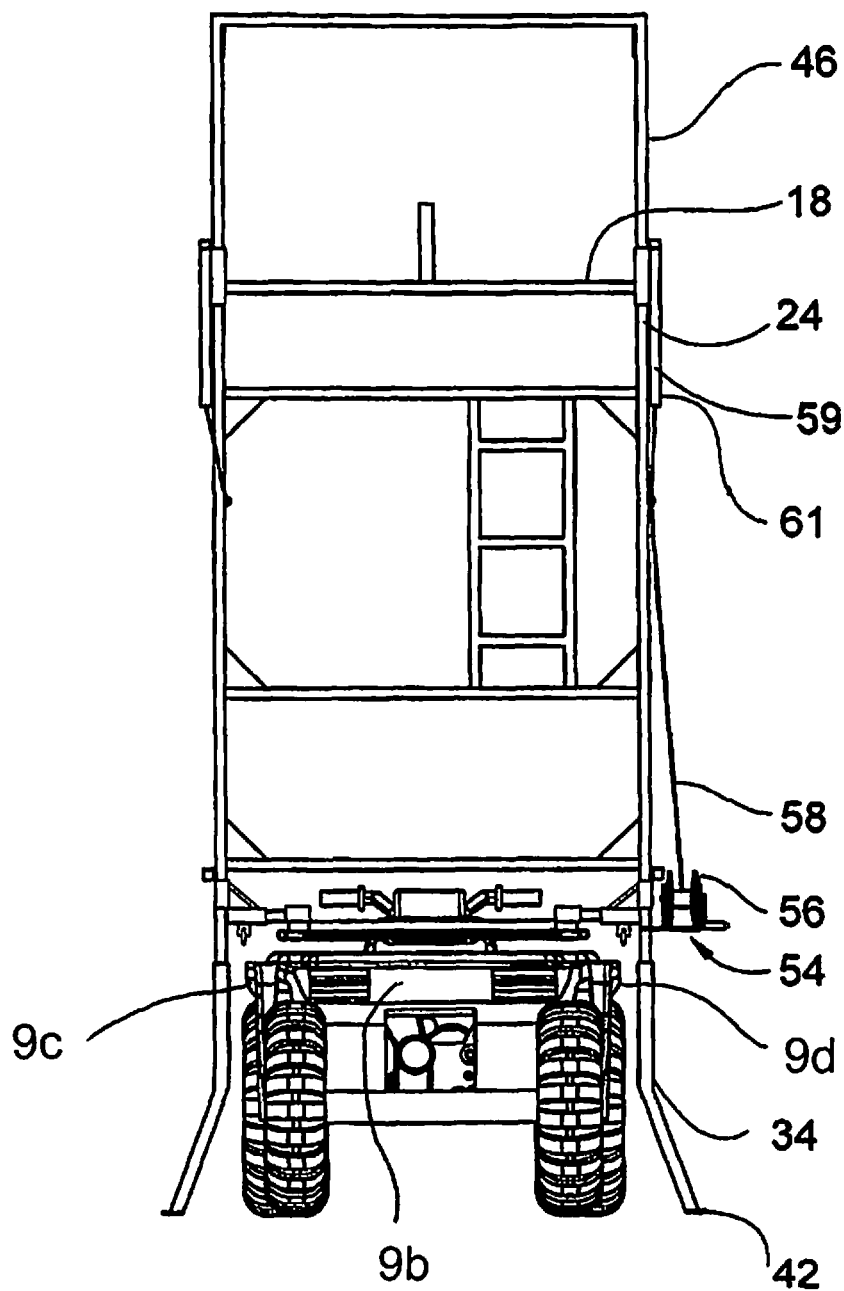
FIG. 16 is a rear view of the elevatable platform depicted in FIG. 12 with the elevatable platform positioned in the elevated position.
Figure 17:
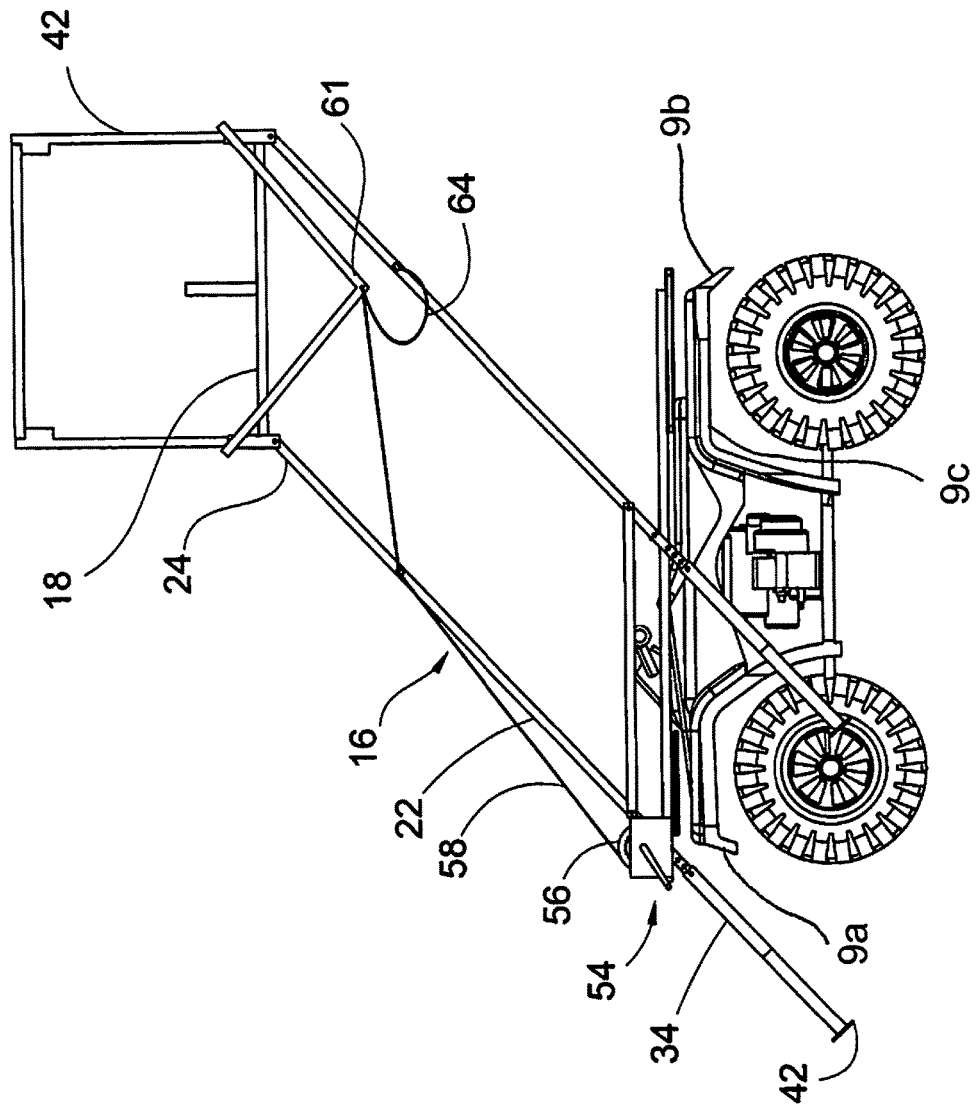
FIG. 17 is a side view of the elevatable platform depicted in FIG. 12 with the elevatable platform positioned between the elevated and lowered position.

As shown in FIGS. 1-6, a recreational or utility vehicle 2 for use with the present invention generally comprises a driver's seat 4, a vehicle body 6 and a motorized wheel assembly 8. The vehicle is further defined by a having a front end 9a, a rear end 9b, a left side 9c and a right side 9d as shown in FIGS. 15 - 17. Representative vehicles 2 can include, but are not limited to, all-terrain vehicles (ATV), three-wheelers, utility carts, lawn tractors and other similar motorized recreational or utility vehicles. The vehicle body 6 defines at least one support surface 10 proximate to the top of the vehicle 2 for receiving and supporting a mounted structure such as an elevatable platform system. According to an embodiment of the present invention, the driver's seat 4 is positioned such that the driver's head is above the top of the vehicle 2 when operating the vehicle.

As shown in FIGS. 1-6, a representative embodiment of an elevatable platform system 12 of the present invention can comprise an elevatable platform 14 and a collapsible support structure 16. The elevatable platform 14 comprises a platform base 18 defining a generally rectangular shape. The collapsible support structure 16 comprises at least one mounting rail 20 positionable on the support surface 10 on the vehicle and at least one rotatable support beam 22 having a first end 24 and a second end 26.

Figure 6:
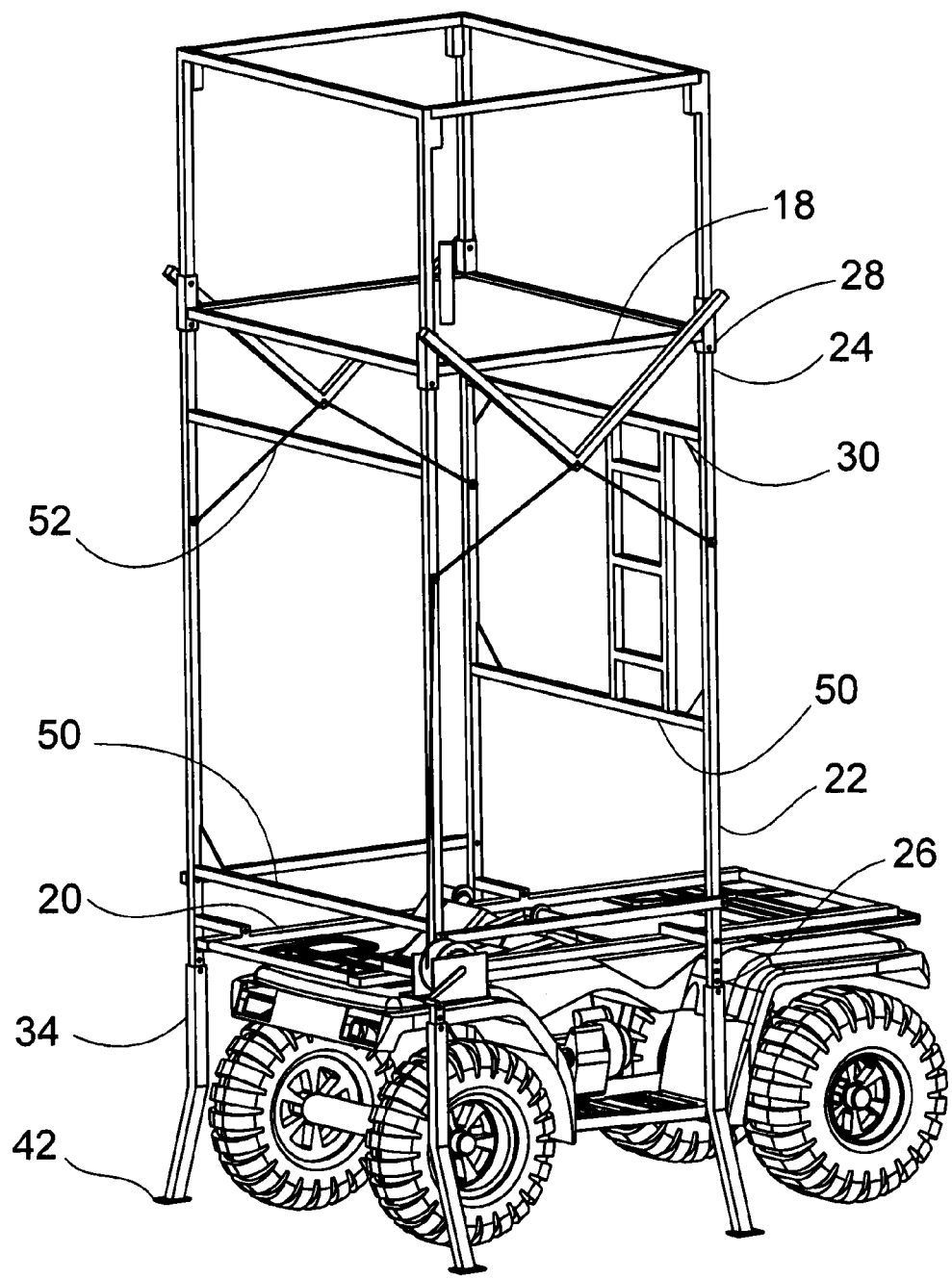
FIG. 6 is a front perspective view of the elevatable platform depicted in FIG. 5.
Figure 7:
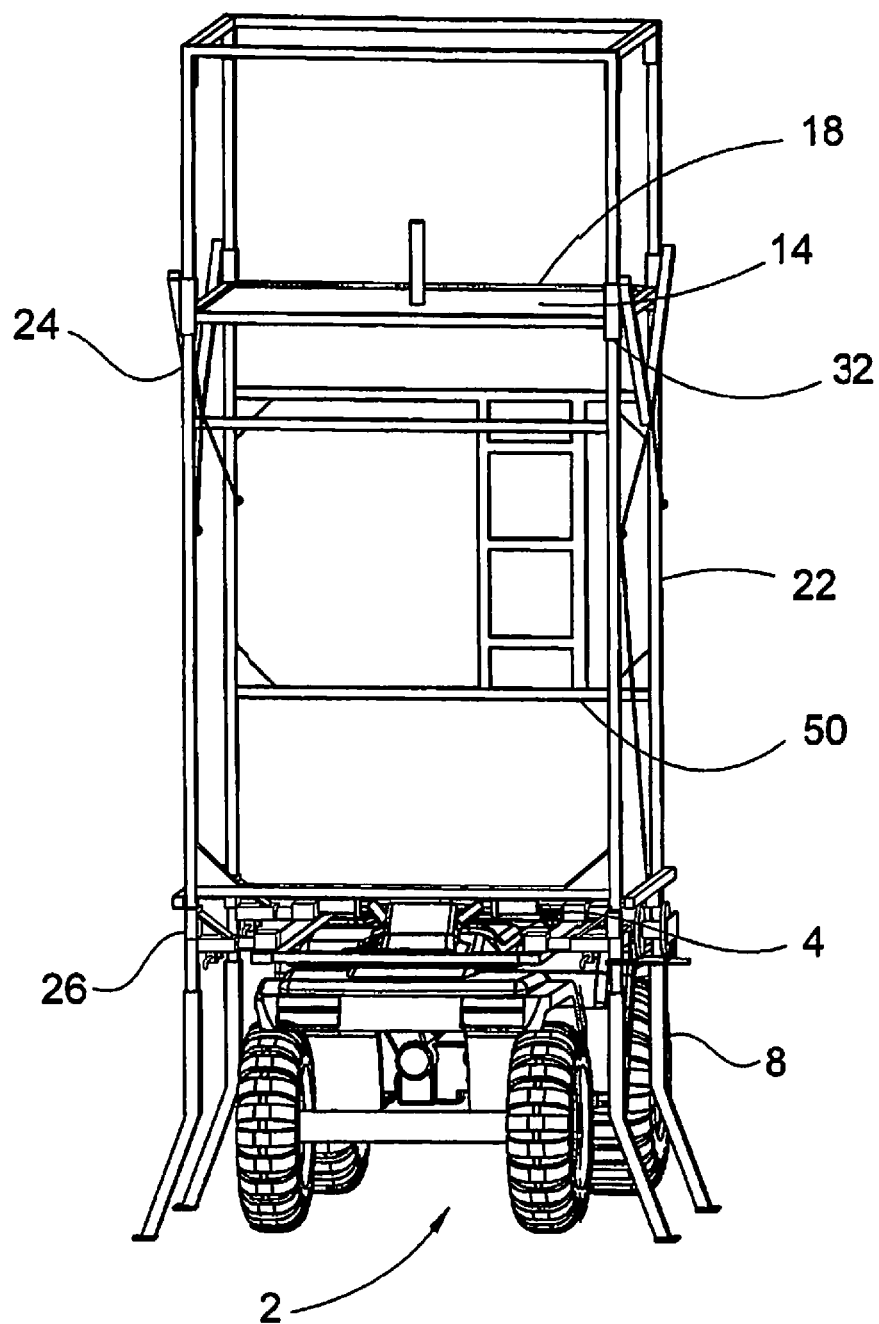
FIG. 7 is a rear perspective view of the elevatable platform depicted in FIG. 5.
Figure 11:
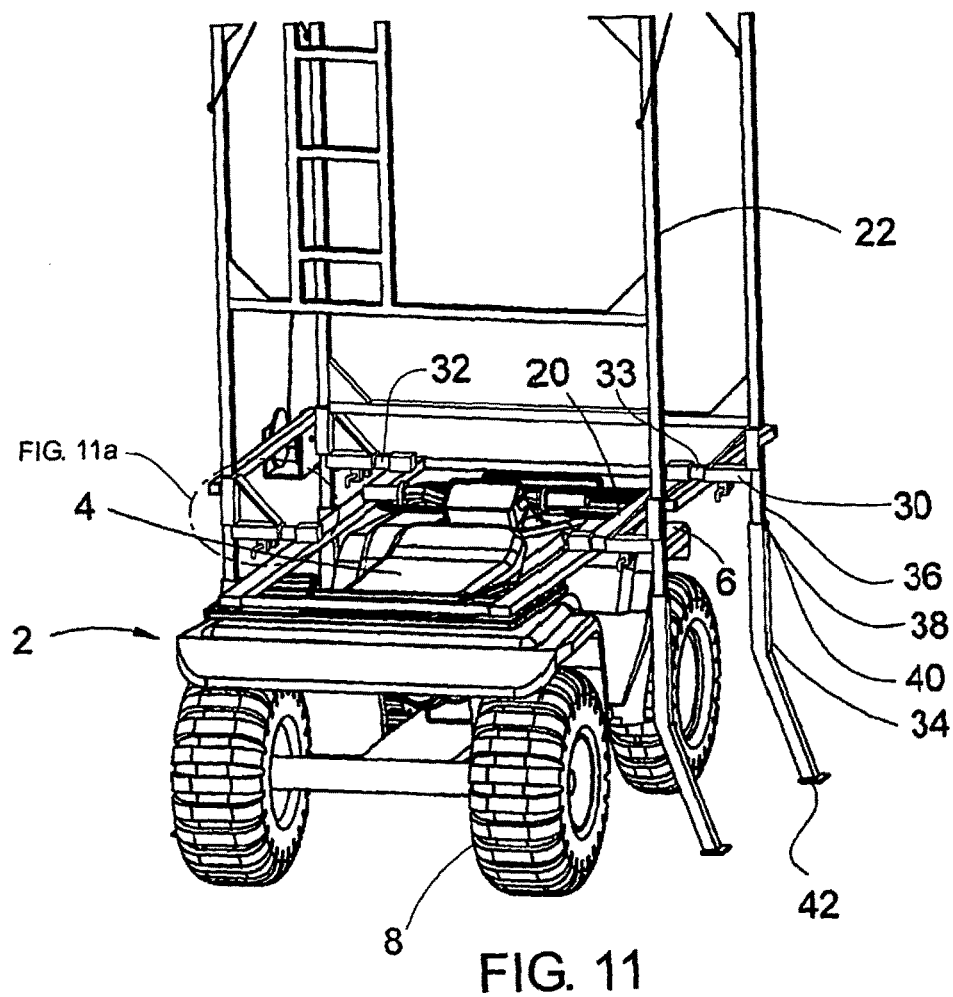
FIG. 11 is a rear perspective view of the elevatable platform system depicted in FIG. 5.
Figure 11A:
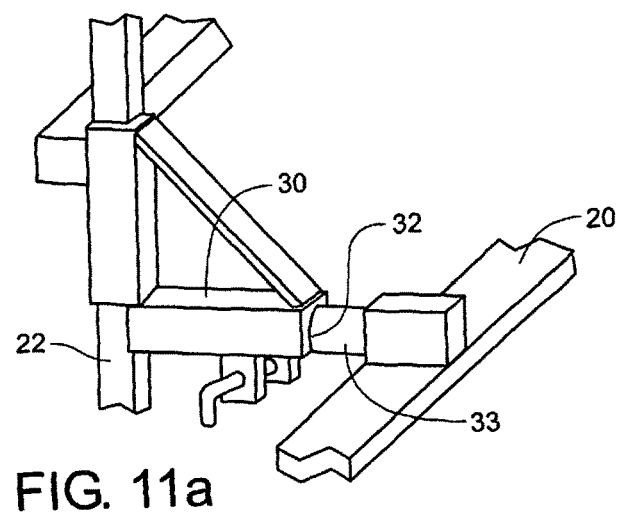
FIG. 11a is a enlarged perspective view of the elevatable platform system depicted in FIG. 5 taken at Detail 11a of FIG. 11.
Figure 12:
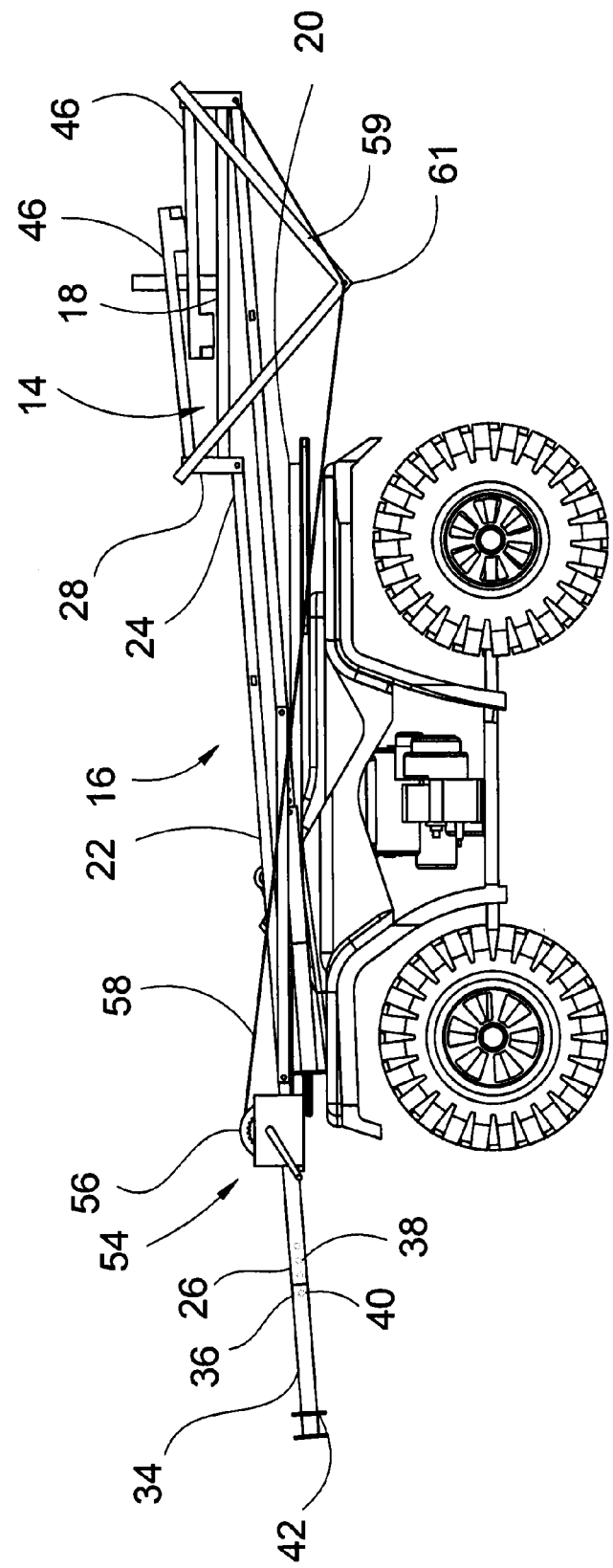
FIG. 12 is a side perspective view of an elevatable platform system mounted to a vehicle according to an embodiment of the present invention with the elevatable platform positioned in a lowered transport position.
Figure 13:
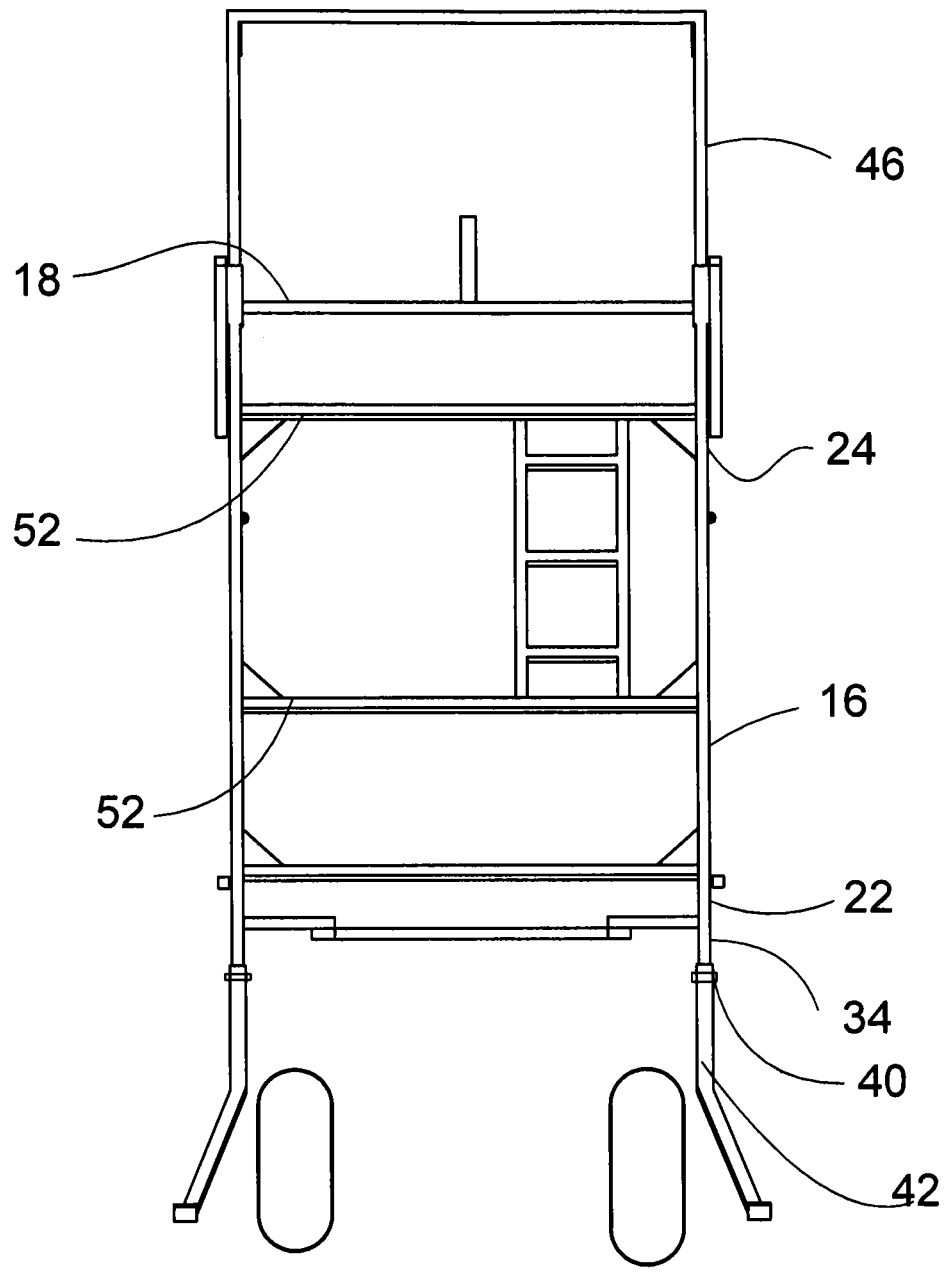
FIG. 13 is a rear view of the elevatable platform depicted in FIG. 12 with the elevatable platform positioned in the elevated position.
Figure 14:
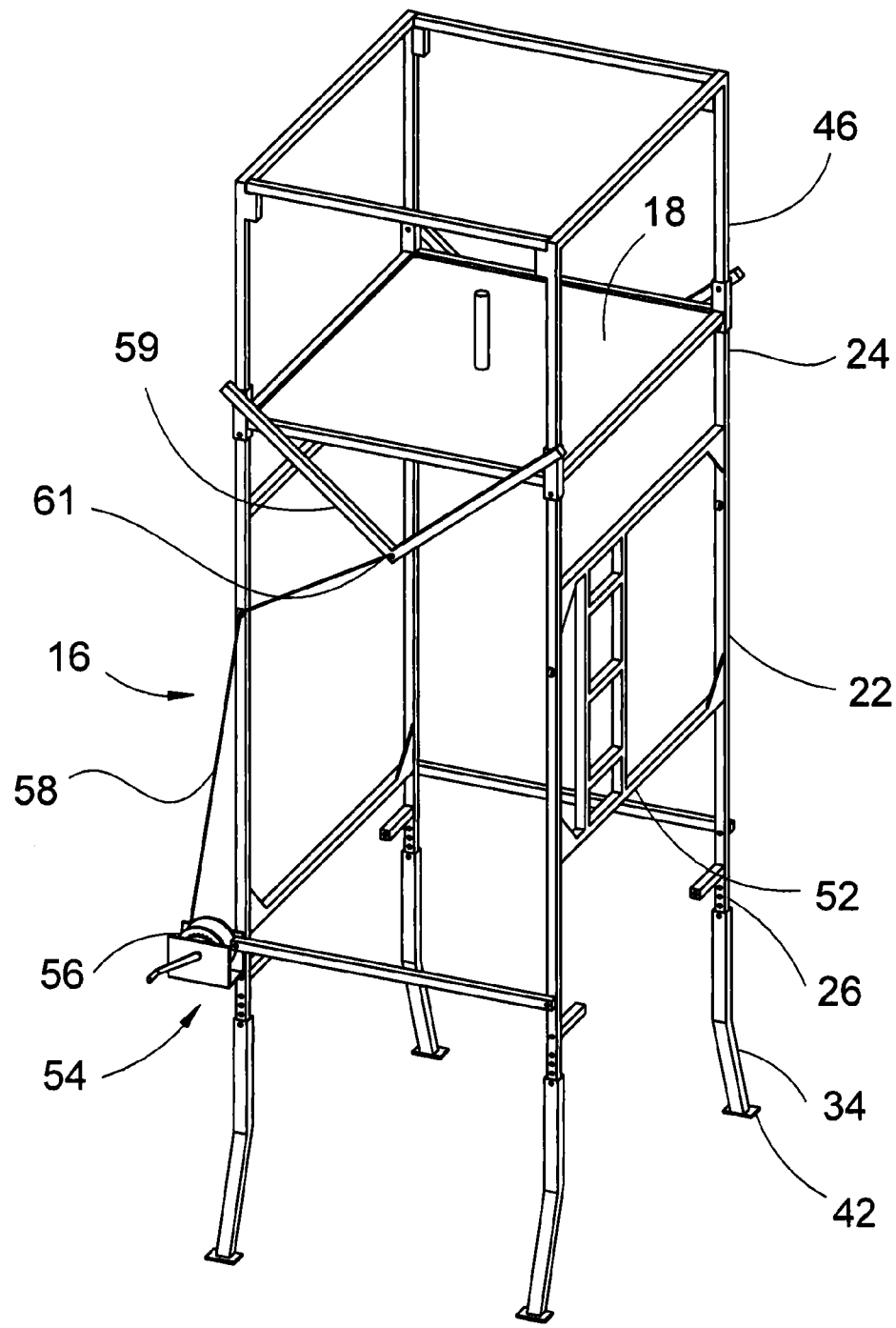
FIG. 14 is a perspective view of the elevatable platform depicted in FIG. 12 with the elevatable platform positioned in the elevated position.

As shown in FIGS. 1-6 and 11-17, the first end 24 of each rotatable support beam 22 is rotatably mounted to the platform base 18. As depicted in FIG. 6, the elevated platform 14 can further comprise at least one elongated protrusion 28 affixable to the platform base 18 and is adapted to be bolted to the first end 24 of the support beam 22 to rotatably mount the platform base 18 to the support beam 22. Similarly, the second end 26 of each rotatable support beam 22 is rotatably mounted to one mounting rail 20. As depicted in FIGS. 11 and 11a, each support beam 22 can further comprise an arm 30 extending from the support beam 22 at an angle perpendicular to the longitudinal axis of the support beam 22. Each support beam 22 can also further comprise a socket 32 positioned on the arm 30. In this configuration, the mounting rail 20 can further comprise a shaft 33 extending from the mounting rail 20 at an angle perpendicular to the longitudinal axis of the mounting rail 20 and adapted for positioning within the socket 32 of the arm 30 so as to rotatably mount the support beam 22 to the mounting rail 20.

As shown in operation in FIGS. 4-6 and 17, each rotatable support beam 22 is rotatable about an axis a-a proximate to its second end 26 between a generally horizontal orientation and a generally vertical orientation. When the support beam 22 is positioned in the generally horizontal orientation, the platform base 18 mounted to the first end 24 of the support beam 22 is lowered to a height proximate to the height of the mounting rail 20. When the mounting rail 20 is positioned on the support surface 10 of the vehicle 2, the mounting rail 20 and correspondingly the lowered platform base 18 is proximate to the maximum height of the vehicle. According to an embodiment of the present invention, the lowered height of the platform base 18 is proximate to or lower than the top of the driver's head in vehicles where the driver's seat 4 is positioned such that the driver's head is above the top of the vehicle. When the support beam 22 is positioned in the generally vertical orientation, the platform base 18 is elevated above the mounting rail 20. According to an embodiment of the present invention, each support beam 22 can comprise telescoping features to change the effective length of each support beam 22 and correspondingly the height of the platform base 18 when the support beam 22 is positioned in the generally vertical orientation.

As shown in FIGS. 4-6 and 17, each support beam 22 can further comprise a deployable support leg 34 at the second end 26 of the support beam 22. The deployable support leg 34 is insertable into the second end 26 of the support beam 22 and is adapted to be telescoped from the support beam 22 when the support beam 22 is in the vertical orientation to engage the ground beneath the vehicle 2. According to an embodiment of the present invention, the support beam 22 can further comprise a plurality of locking holes 36 proximate to the second end 26 of the support beam 22. The deployable support leg 34 also comprises a corresponding locking hole 38 adapted to align with at least one of the locking holes 36 on the support beam 22 corresponding to the extension of the deployable support leg 34. A locking pin 40 can be inserted through the aligned locking holes 36, 38 to lock the support leg 34 at the particular extension length. The extension of each support leg 34 can be set independently of support legs 34 of other support beams 22 so as to accommodate uneven terrain. According to an embodiment of the present invention, each deployable support leg 34 can further comprise a foot pad 42 aiding the deployable support leg 34 in gripping the ground beneath the vehicle 2.

As shown in FIGS. 1, 10 and 13-16, the elevatable platform 14 can further comprise a deployable safety rail system 44. The deployable safety rail system 44 comprises two opposing c-shaped rails 46 rotatably mounted to the elevatable platform 14 and two attachable intermediate rails 48. The c-shaped rails 46 are movable between a generally horizontal orientation for storage and transport and a generally vertical orientation in which each c-shaped rail 46 defines a rail for one side of the platform base 18. The intermediate rails 48 are adapted to be attached to the c-shaped rails 46 such that the intermediate rails 48 extend between the c-shaped rails 46 to define a continuous rail around the periphery of the platform base 18. According to an embodiment of the present invention, each intermediate rails 48 can be rotatable affixed to one of the c-shaped rails 46 via a hinge 49 and adapted to swing out to engage the other c-shaped rail 46 when the c-shaped rails 46 are positioned in the vertical orientation.

As depicted in FIGS. 4-6 and 13-14, the elevatable platform system 12 comprises two opposing pairs of support beams 22a, 22b wherein each support beam 22a, 22b is rotatably mounted to the platform base 18 proximate to one of the corners of the platform base 18. In this configuration, each pair of support beams 22a, 22b is mounted to one mounting rail 20a, 20b. In operation, the opposing mounting rails 20a, 20b are positioned on opposing sides of the vehicle 2. According to an embodiment of the present invention, the collapsible support structure 16 can further comprise at least one intermediate support 50 extending between the opposing pairs of support beams 22a, 22b to maintain the distance between the support beams 22a, 22b and improve the stability of the collapsible support structure 16 when the support beams 22a, 22b are positioned in the vertical orientation. Similarly, the support structure 16 can also further comprise at least one intermediate support beam 52 rotatably mounted to the support beams 22 of each opposing pair such that each opposing pair of support beams 22a, 22b are moved between the vertical and horizontal orientation together. The intermediate support beam 52 also improves the overall stability of the collapsible support structure 16.

Figure 8:
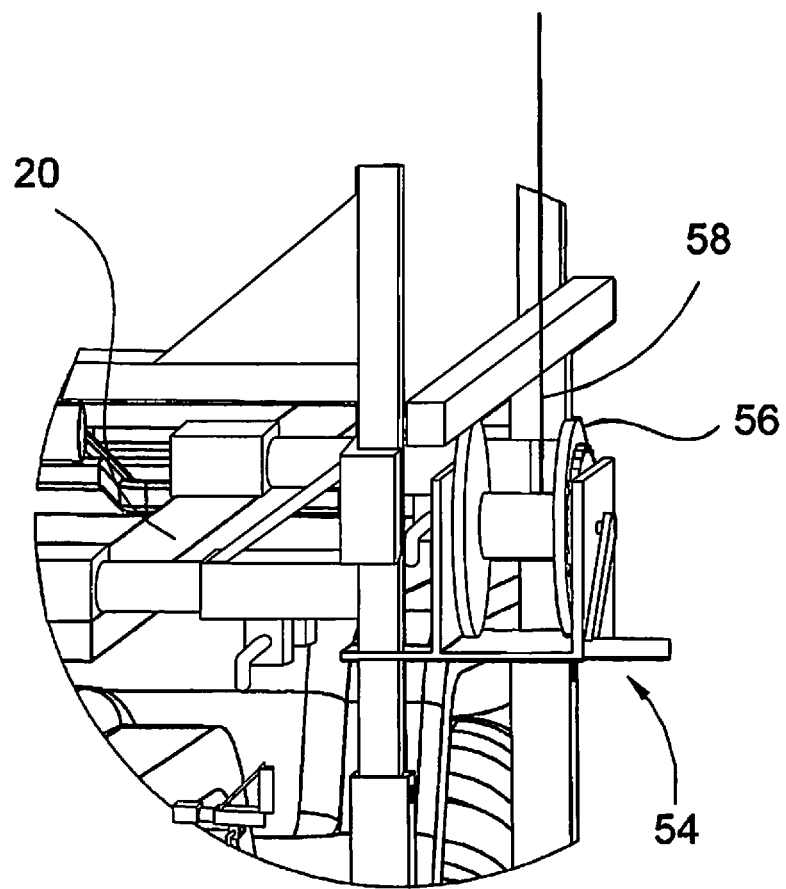
FIG. 8 is a front view of the winch system for elevating the elevatable platform according to an embodiment of the present invention.
Figure 9:
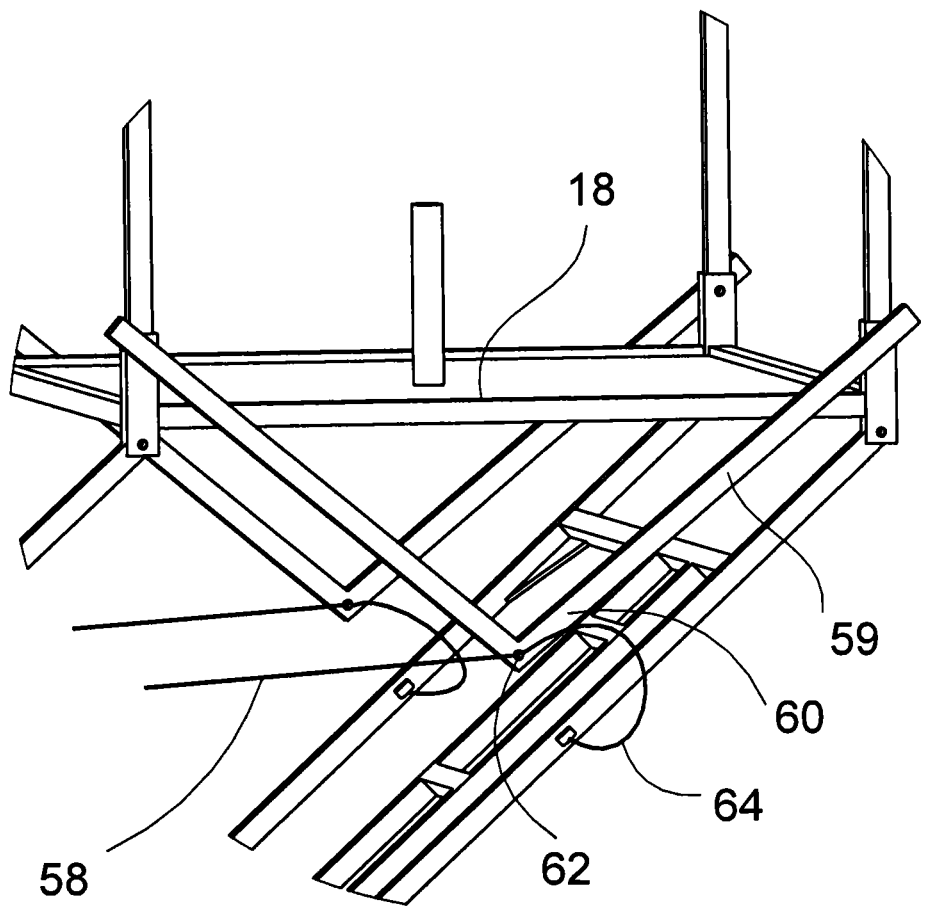
FIG. 9 is a front perspective view of an angle beam for assisting with elevating the elevatable platform according to an embodiment of the present invention.
Figure 10:
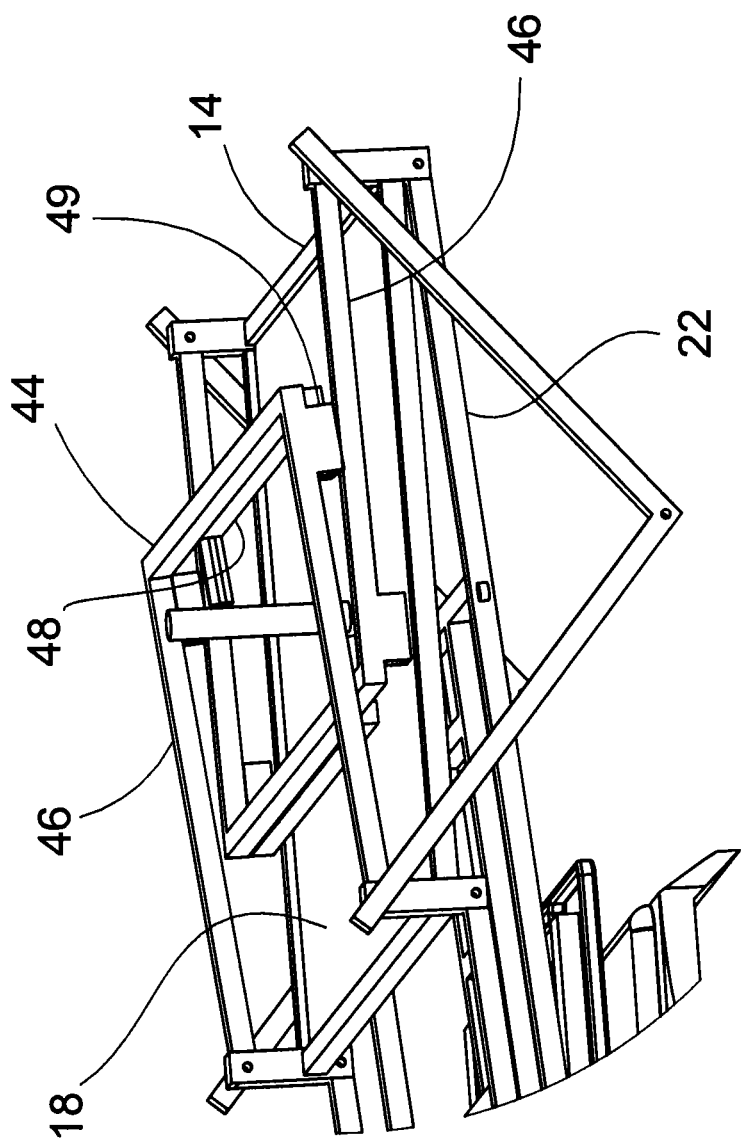
FIG. 10 is a side perspective view of a safety rail system according to an embodiment of the present invention in lowered rail position.

As shown in FIGS. 4, 8, 14-15 and 17, according to an embodiment of the present invention, the collapsible support structure 16 further comprises a winch system 54 for moving the at least one support beam 22 between the vertical orientation and the horizontal orientation. The winch system 54 can comprise a winch 56 and a winch cable 58. As depicted in FIGS. 8, the winch 56 comprises a mechanically cranked winch, but can also comprise a motor driven winch or alternatively, suitable hydraulic or pneumatic lifting means. In operation, the end of the winch cable 58 is attached to the first end 24 of the at least one rotatable support beam 22. As the winch 56 is actuated to shorten the effective length of the winch cable 58 between the winch 56 and the first end 24 of the rotatable support beam 22, the support beam 22 is pulled into vertical orientation to elevate the platform 14. Similarly, actuating the winch 56 to increase the effective length of the winch cable 58 lowers the rotatable support beam 22 into the horizontal orientation to lower the platform 14.

As depicted in FIGS. 4, 8-9, 14-15 and 17, the winch 56 can be affixed to the first support beam 22a of an opposing pair of support beams 22. Correspondingly, the end of the winch cable 58 is affixed to the second end 24 of the second support beam 22b of the opposing pair of support beams 22. In this configuration, actuating the winch 56 to shorten the effective length of the winch cable 58 pulls the second support beam 22b into a vertical orientation while the intermediate support beam 52 causes the first support beam 22a to move into the vertical orientation with the second support beam 22b. According to an embodiment of the present invention, the first support beam 22 can further comprise an eyebolt 60 for slidably receiving the winch cable 56. The eyebolt 60 is positioned to angle the winch cable 58 as the second support beam 22 is pulled into the vertical orientation such that second support beam 22 is pulled into the vertical orientation at a consistent rate. Similarly, the intermediate support beam 50 extending between the opposing pairs of support beams 22a, 22b causes the entire collapsible support structure 16 to move into the vertical orientation together. According to an embodiment of the present invention, the elevatable platform 14 further comprises at least one angle beam 59 defining a fulcrum point 61 and extending below the platform base 18. The angle beam 59 comprises a eyebolt 62 positioned proximate to the fulcrum point 61 for receiving the winch cable 58 to angle the winch cable 58 as the second support beam 22 is pulled into a vertical orientation. According to an embodiment of the present invention, a second cable 64 can be affixed to the fulcrum point 61 and the second support beam 22. The second cable 64 is adapted to be pulled taut when the second support beam 22 is pulled into the vertical orientation to increase the stability of the overall support structure 16.

The present invention is further directed to a method for positioning an elevatable platform 14 and can comprise mounting an elevatable platform system 12 having an elevatable platform 14 and a collapsible support structure 16 on a vehicle 2. The method further comprises maneuvering the vehicle 2 with the mounted elevatable platform system 14 to a desired position with the support structure 16 collapsed such that the elevatable platform 14 is proximate to the height of the vehicle 2. Finally, the method further comprises extending the support structure 16 to elevate the elevatable platform 14 above the vehicle 2. According to an embodiment of the present invention, the method can further comprise extending support legs 34 from the support structure 16 to engage the ground beneath the vehicle 2 to further stabilize the platform system 14.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

What is claimed:
1. A vehicle mountable elevatable platform comprising:
a mounting rail positionable on an upper surface of a vehicle such that the mounting rail resides substantially parallel to the ground, the mounting rail including a pair of front shafts and a pair of rear shafts, the front and rear shafts extending perpendicular to a longitudinal axis of the mounting rail;
a platform base movable between a lowered position and an elevated position; a pair of front support beams and a pair of rear support beams, each front support beam and each rear support beam having a first end and a second end, wherein each front and rear support beam includes an arm extending at a perpendicular orientation to a longitudinal axis of the corresponding front and rear support beam, each arm including a socket configured to engage the corresponding front and rear shaft of the mounting rail such that the front and rear support beams are rotatable relative to the mounting rail; and
wherein each front and rear support beam is rotatable between a substantially horizontal orientation for positioning the platform base in the lowered position and a substantially vertical orientation for positioning the platform base in the elevated position while both the front and rear support beams remain coupled to the mounting rail with the arms on each front and rear support beam adapted to rotate each front and rear support beam outside the upper surface and opposed sides of the vehicle,
wherein the arm of each front and rear support beam is disengageable from the mounting rail when the platform base is in the elevated position, and said front and rear support beams supporting the platform base when in the elevated position and when each support beam is disengaged from the mounting rail, and
wherein the platform base remains in an orientation substantially parallel to the ground as the platform base transitions between the lowered and elevated positions.

2. The elevatable platform of claim 1, wherein the pair of front support beams and the pair of rear support beams are adapted to rotate in parallel between the horizontal and vertical orientations to maintain the platform base in an orientation substantially parallel to the ground during the transition between the lowered and elevated position.

3. The elevatable platform of claim 1 further comprising:
a winch system having:
a winch mounted to the mounting rail; and
a winch cable affixed to at least one front or rear support beam and windable onto the winch to rotate the front and rear support beams between the horizontal and vertical orientations.

4. The platform base of claim 1 further comprising:
a safety rail system having:
   at least two side rails movable between a horizontal orientation in which each side rail is folded against the platform base and a vertical orientation in which each side rail defines an elevated railing along one edge of the platform base; and
   at least two intermediate rails positionable between the two side rails positioned in the vertical orientation to define a continuous railing between the side rails.

5. The platform of claim 4, wherein the safety rail system further comprises:
a hinge for rotatably affixing each intermediate rail to one side rail, wherein the intermediate rail is rotatable between a retracted position against the side rail when the side rail is positioned in the horizontal orientation and a deployed position defining a continuous elevated railing between two side rails when the side rails are positioned in the vertical orientation.

6. The platform of claim 1, wherein each of the front and rear support beams further comprises a support leg extendable from the second end of each front and rear support beam for engaging the ground to maintain the platform base in an orientation substantially parallel to the ground when in the elevated position, where each support leg is individually extendible to conform to uneven terrain such that the platform base is simultaneously stabilized by both the support legs and the mounting rail.

7. A vehicle mountable elevatable platform, comprising:
a platform base movable between a lowered position and an elevated position;
a pair of front support beams and a pair of rear support beams, each front and rear support beam having an arm extending perpendicular to a longitudinal axis of each front and rear support beam, each arm configured to engage a corresponding shaft extending from a mounting rail positionable on a top vehicle surface such that each front and rear support beam is rotatable relative to the mounting rail, wherein the front and rear support beams are rotatable between a substantially horizontal orientation for positioning the platform base in the lowered position and a substantially vertical orientation for positioning the platform base in the elevated position, and wherein the arm of each front and rear support beam remains rotatably engaged to the corresponding shaft on the mounting rail as the support beams rotate between the substantially horizontal orientation and the substantially vertical orientation, said front and rear support beams rotating outside a pair of opposed left and right sides of the top vehicle surface, and
wherein the arm of each front and rear support beam is disengageable from the mounting rail when the platform base is in the elevated position, and said front and rear support beams supporting the platform base when in the elevated position and when each support beam is disengaged from the mounting rail, and
a support leg attached to a second end of each front and rear support beam, each support leg being individually extendible from the second end of each front and rear support beam to engage a ground surface with the platform base in the elevated position.

8. The vehicle mountable elevatable platform of claim 7, wherein each support leg and the platform base are proximate a height of the mounting rail when the platform base is in the lowered position.

9. The vehicle mountable elevatable platform of claim 7, wherein the platform base is substantially parallel to the top vehicle surface when the platform base is in the lowered position, wherein the platform base is substantially parallel to the top vehicle surface when the platform base is in the elevated position and wherein the platform base is substantially parallel to the top vehicle surface as the platform base moves between the lowered position and the elevated position.

10. A vehicle mountable elevatable platform, comprising:
a platform base movable between a lowered position and an elevated position;
a pair of front and rear support beams, each front and rear support beam having an arm extending perpendicular to a longitudinal axis of each front and rear support beam, each arm configured to engage a corresponding shaft extending from a mounting rail positionable on a vehicle surface such that each front and rear support beam is rotatable relative to the mounting rail, wherein each front and rear support beam is rotatable between a substantially horizontal orientation for positioning the platform base in the lowered position and a substantially vertical orientation for positioning the platform base in the elevated position with the arm on each front and rear support beam remaining engaged to the mounting rail as the platform base rotates between the lowered position and the elevated position with said front and rear support beams
rotating outside a pair of opposed left and right sides of the mounting rail defined by the vehicle surface, and
wherein the arm of each front and rear support beam is disengageable from the mounting rail when the platform base is in the elevated position, and said front and rear support beams supporting the platform base when in the elevated position and when each support beam is disengaged from the mounting rail.

11. The vehicle mountable elevatable platform of claim 10, wherein the platform base is proximate a height of the mounting rail when the platform base is in the lowered position.

12. The vehicle mountable elevatable platform of claim 10, wherein the platform base is substantially parallel to the vehicle surface when the platform base is in the lowered position, wherein the platform base is substantially parallel to the vehicle surface when the platform base is in the elevated position and wherein the platform base is substantially parallel to the vehicle surface as the platform base moves between the lowered position and the elevated position.

13. The vehicle mountable elevatable platform of claim 10, wherein each front and rear support beam includes a support leg extending forward of the corresponding arm when the platform base is in the lowered position.

14. The vehicle mountable elevatable platform of claim 10, wherein a support leg is slidingly deployable from each front and rear support beam such that a foot pad on the support leg can engage a ground surface when the platform base is in the elevated position.

* * * * *